Figure 1:
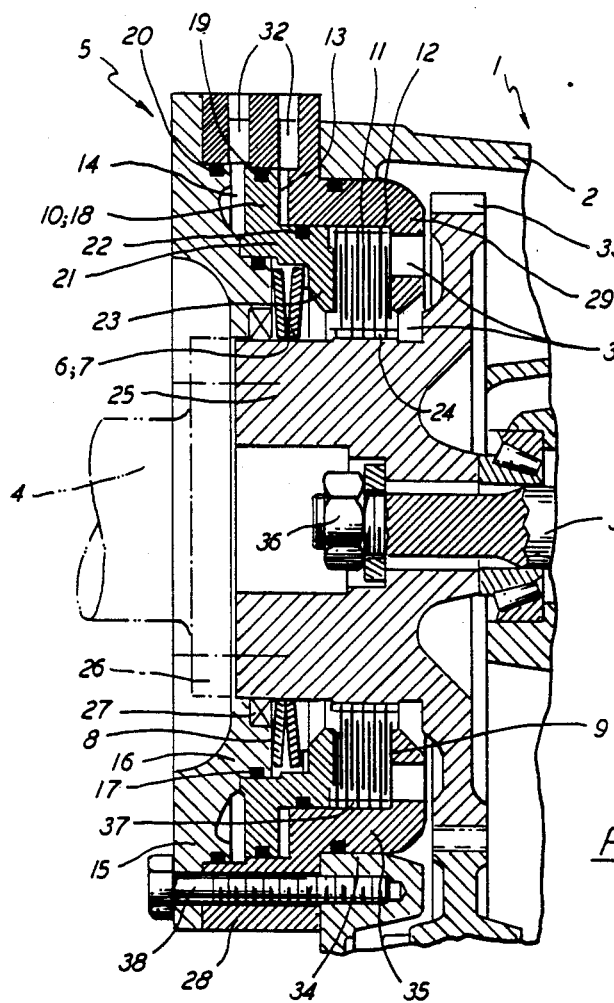

United States Patent [19]

Ehrlinger et al.

[11] Patent Number: 4,667,527
[45] Date of Patent: May 26, 1987

[54] SPRING-LOADED BRAKE WITH PRESSURE-MEDIUM-OPERABLE LIFTING SET

[75] Inventors: Friedrich Ehrlinger; Manfred Goeft; Helmut Göller, all of Friedrichshafen, Fed. Rep. of Germany

[73] Assignee: Zahnradfabrik Friedrichshafen AG, Friedrichshafen, Fed. Rep. of Germany

[21] Appl. No.: 477,830

[22] Filed: Mar. 22, 1983

[30] Foreign Application Priority Data

Mar. 27, 1982 [DE] Fed. Rep. of Germany ....... 3211366

[51] Int. Cl.⁴ .................................... F16D 65/24
[52] U.S. Cl. ................................. 74/411.5; 188/170
[58] Field of Search ............. 74/411.5, 772; 192/4 A, 192/18 A; 188/170

[56] References Cited

U.S. PATENT DOCUMENTS

| Re. 31,168 | 3/1983 | Hedgcock | 188/170 X |
|---|---|---|---|
| B 533,968 | 1/1976 | Cummins et al. | 74/710.5 |
| 1,194,783 | 8/1916 | Rennerfelt | 188/170 X |
| 1,776,765 | 9/1930 | Ferris | 188/170 X |
| 1,852,935 | 4/1932 | Morier | 192/4 A |
| 2,123,202 | 7/1938 | Rauen | 192/4 A |
| 3,469,806 | 9/1969 | Olchawa | 74/411.5 |
| 3,485,329 | 12/1969 | Hauser | 74/411.5 |
| 3,507,372 | 4/1970 | Gilbertson et al. | 74/411.5 |
| 3,536,230 | 10/1970 | Williams | 74/411.5 X |
| 4,184,573 | 1/1980 | Bricker et al. | 188/170 |
| 4,192,405 | 3/1980 | Lee et al. | 188/170 |
| 4,245,724 | 1/1981 | Beck | 188/170 |
| 4,279,330 | 7/1981 | Pottorff et al. | 188/71.7 |
| 4,295,798 | 10/1981 | McIntosh | 74/710.5 |
| 4,296,650 | 10/1981 | Kalns | 188/170 |
| 4,532,827 | 8/1985 | Beim | 74/411.5 |

FOREIGN PATENT DOCUMENTS

| 2460801 | 7/1976 | Fed. Rep. of Germany . |
|---|---|---|
| 2510193 | 9/1976 | Fed. Rep. of Germany . |
| 2619980 | 2/1977 | Fed. Rep. of Germany . |
| 1504073 | 3/1978 | United Kingdom . |
| 1522329 | 8/1978 | United Kingdom . |
| 2059525 | 4/1981 | United Kingdom . |

OTHER PUBLICATIONS

"Matrix Series 56P Spring Applied Pressure Release Safety Brake for Operation in Oil".

Primary Examiner—Allan D. Hermann
Attorney, Agent, or Firm—Hayes, Davis & Soloway

[57] ABSTRACT

A spring-loaded brake may be modulated by an integrated brake-actuating cylinder of almost unchanged constructional length, arranged radially above a spring-packet which acts in a direction contrary to the lifting force of the cylinder. The brake still has the automatic emergency stopping function of the parking brake principle. The spring packet acts against a brake piston which is acted upon by pressure at both ends by cylinders which are equipped with gaskets for sealing them both against each other and against the transmission housing. The brake discs and splash lubrication of the transmission are in communication via oil passage sections. The brake housing is designed as an assembly built into the transmission and its cover flange may be equipped with a shaft seal for fitting a shaft extension to a drive shaft. The brake hub body can be shaped as a shaft flange which brake hub body can also be the hub of a gear wheel.

5 Claims, 2 Drawing Figures

U.S. Patent  May 26, 1987  4,667,527

SPRING-LOADED BRAKE WITH PRESSURE-MEDIUM-OPERABLE LIFTING SET

This invention relates to spring-loaded brakes with pressure-medium operable brake release for vehicles and is directed towards a design with which the range of applications of spring-loaded brakes can be extended.

It is known (e.g. from the DE-OS No. 24 60 801) that if vehicles are fitted with spring-loaded brakes, this leads to space and layout problems. These problems are particularly apparent, where brake actuation is characterized, for example by a separate arrangement of actuating device and brake. Dry brakes, in such applications, in particular, have proved to be disadvantageous as relatively large braking strokes are required in order to compensate for the wear of the friction pads. Apart from piston-rod-type spring brakes, annular spring-loaded brakes which are fitted concentrically over the respective shaft (see Type Sheet 56P by Matrix Engineering Ltd., Brechin, Angus, Scotland, GB) have been proposed. The use of such brakes has hitherto been undesirable because the higher the power of the brake and the smoother its operation was to be, the greater its weight and volume. Where low-power brakes were used, it became necessary to provide separate parking brakes on each individual wheel. An additional disadvantage of such brakes is that they did not offer any possibility of modulation, so that it was necessary, even on mini-vehicles, to install separate service brakes.

One of the prior art brake designs details a brake piston to which pressure can be applied from either side as is also known with DE-OS No. 25 10 193. In this, no measures were taken to achieve a brake of short constructional length. The brake referred to has two pistons and two brake surfaces with a spring packet fitted between them. Furthermore, this type of brake is designed for dry operation and for fitting in the wheels of a vehicle. Other prior brakes are described in U.S. Pat. No. 4,279,330 and German DTOS No. 2619980.

It is an object of the present invention to provide a multi-purpose, short-stroke, spring-loaded brake having a minimal requirement of constructional length, a very low dead weight, a high degree of functional reliability, easy installation and low volume that largely eliminates the space and arrangement problems arising in vehicles.

According to the invention there is provided a spring-loaded brake with pressure-medium-operable release, in particular for vehicles, comprising a brake-actuating cylinder opposing a brake-lifting cylinder on the same brake piston, and further essentially consisting of a shaft rotatable in a brake housing and carrying one or several brake disc(s) which, in free-wheeling condition, have axial play in relation to the brake piston, but which can be pressed during braking, either mechanically by means of a spring packet installed under initial tension and resting against a first inner face of the housing, or hydraulically, by means of the brake-actuating cylinder, against a second inner face of the housing. The brake is a single-action, wet brake, and extends as an intermediate flange into a transmission housing. The cylinders and the brake piston concentrically surround the radially arranged spring packet in such a way that the brake can be removed as a whole from the transmission housing through a cover flange closing off the brake housing.

By integrating the brake in a transmission and by designing it as a wet running brake, its loading capacity is increased coupled with short constructional length. Applying pressure to either side of the piston and arranging the piston concentrically over the springs reduces the constructional length. Furthermore, the fact that the brake discs extend into an existing transmission housing minimizes the constructional length and makes the use of this brake particularly suitable for small vehicles. The almost concentric arrangement of the two cylinder chambers relative to the spring packet makes it possible to achieve a design that is appreciably easier to manufacture, that weighs less and that is considerably shorter and less expensive than any previously known design.

It is no longer necessary with the present invention, as in the design of dry brakes, to make allowances for the increased wear on the spring packet or premature decline of the brake by providing a correspondingly large adjustment capacity, since the friction surfaces are oil-cooled and secured against the intrusion of dirt and since the contact pressure can be modulated or increased.

A larger braking surface, without additional constructional space, is possible, for each brake, because of the concentric disposition of the brake cylinder and spring packet and attachment onto a basically existing transmission to form its cover. This permits multiple use of housing elements' and permits large diameters on especially friction-effective, annular holohedral brake discs in places, where large diameters do not adversely affect road clearance or accessibility of a vehicle.

Furthermore it now becomes possible, on a spring-loaded brake, due to already known valve combinations for brake pressure modulation of ordinary vehicle service brakes, to provide partial braking and still use a brake-actuating cylinder, due to the extremely short spring packet, and its disposition enclosing the spring packet, which does not require any additional axial constructional length. Also all components are better protected against bumps.

Due to the invention, there is now no longer any need, even on mini-vehicles, for several individual brakes, which are easily damaged, and one central service and parking brake is henceforth sufficient, which may, for example, be fitted with great effect to the universal shaft on which it operates at a relatively high relative rotational speed.

Figure 2:
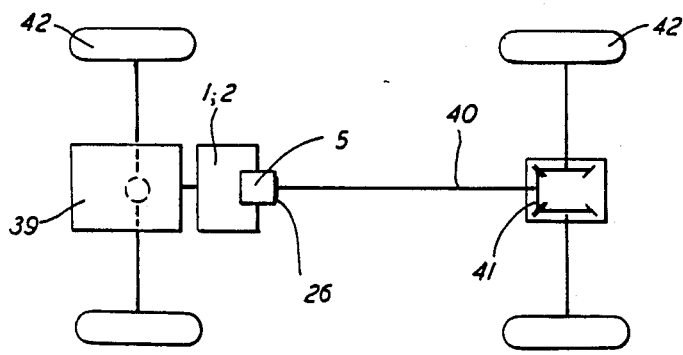

The invention will now be described, by way of example, with reference to the accompanying drawings illustrating a central vehicle brake, in which:

FIG. 1 shows a cross-section through a brake fitted into a transmission housing; and FIG. 2 shows a preferred design of such a built-in brake in the form of a force-flow diagram.

In FIG. 1 a transmission 1 comprises a shaft 3 surrounded by the transmission housing 2, which shaft may be connected, as required, with a shaft extension 4. On the side of the brake, the shaft 3 ends inside a brake housing 5 which encloses it concentrically. In the brake housing a spring packet 6 preferably consisting of cup springs 7 inclined against each other, is supported on the one hand, against the first inner face 8 of the brake housing 5 and on the other hand, against a brake piston 10 inserted in front of the second inner face 9 of the brake housing and axially displaced in relation to shaft 3, or against brake discs 11, 12 under spring pressure exerted by spring packet 6. Above the brake discs 11, 12, between brake piston 10 and second inner face 9, a brake lifting cylinder 13 is circumferentially disposed, whilst a brake-actuating cylinder 14 is provided between brake piston 10 and first inner face 8 of the brake housing 5. The latter cylinder is radially limited by a neck 16 protruding on the brake side from the cover flange 15 of the brake housing 5 on its inner surface and by the brake housing 5 on its outer surface.

The brake-actuating cylinder 14 is sealed towards the transmission side of the brake piston 10 by means of an inner piston-ring seal 17 placed on the neck 16, and in relation to the brake-lifting cylinder 13, by means of an outer piston-ring seal 19 fitted onto an outer collar 18 of the brake piston 10 and has a common ring seal 20 with the cover flange between housing 5 and this flange. The brake-lifting cylinder 13 is additionally sealed from the transmission housing 2 in the area of the inside wall of the brake housing 5 by a central piston ring seal 22 fitted into a generally cylindrical center portion 21 of the brake piston 10 which is slidably arranged above the spring packet 6 or its cup springs 7. The brake piston 10 engages with an inner thrust ring 23 between spring packet 6 and brake discs 11, 12, but without touching the drive-type gearing 24 of the inner brake discs 11, which is attached to a brake hub body 25 pushed into the shaft 3. The front face of the brake hub body 25 is preferably designed so as to accept a shaft flange 26 and the circumference of the brake hub body 25 is in cases, where the cover flange 15 has the shaft 3 running through it in order for instance to fit a shaft extension 4, surrounded by a shaft seal 27. Because we have been successful in placing the spring packet 6 comprising the brake hub body 25 directly opposite the braking surfaces 11, 12 without substantial redirecting of the force flow, and in disposing the cylinders 13, 14 approximately radially outwardly of it, considerable construction space was gained even compared to designs of simple spring-loaded brakes with lifting cylinders staggered laterally to the spring packet. The lubrication system for the discs is open to the transmission by means of connecting oil passage sections 30. There is also a possibility of making double use of the brake body hub 25 and of using it as the hub of a directly attached gear 33. This opens up much better possibilities for the dissipation of heat from the brake into the stock of transmission oil, and the brake discs 11, 12 are reliably and intensively lubricated due to the ladling effect of the gear wheel 33 and passage of lubricating oil to the discs 11/12 through openings 30.

Further advantages of the invention are that the brake assembly is very short in length and that spring pressure as well as hydrualic pressure may be transmitted to the brake disc by a short route.

Integration of the brake housing 5 into the transmission housing 2 is achieved which provides protection against damage and assists lubrication. The brake discs 11, 12 need not be supported against the transmission elements, but against the inner collar 29 of the intermediate flange 28. This makes it possible (by removing bolts 38) to remove the entire brake assembly from the transmission housing 2 as a single unit, without any of the components remaining inside the transmission or being able to fall into it.

By flange-mounting the housing 5 the initial tension of the spring pressure of packet 6 can, for example, be adjusted by the insertion of shims between the brake housing flanges 28 and 31. It is also possible, for example, by loosening the bolts 38 to release the brake in the absence of any pressure-medium pressure in passage 32, such as might be necessary for the towing of a vehicle.

Convenient multiple use can be made of the end of the shaft 3 carrying the brake disc. This offers assembly advantages since the transmission housing itself needs no access opening of its own.

If the brake lifting cylinder 13 has no higher pressure applied to it than is applied to the brake actuating cylinder 14, or if (as shown) the brake piston 10 has a smaller annular area relative to the brake lifting cylinder 13 than it has relative to the brake actuating cylinder 14, it can be ensured that in no operating situation, such as might arise through some remaining compressed-air pressure, will the braking force be unacceptably reduced. In other words, it can be ensured by the design itself without the provision of any separate pressure reducing valve, that the brake lifting force will always be lower than the brake actuating force.

A favorable mode of construction which also provides a brake piston arrangement that is more easily manufactured is achieved by reason of the fact that both the brake lifting cylinder 13 and also the brake actuatinq cylinder 14 are of greater internal diameter than the spring packet 6, with the brake piston 10, having a first collar 18 that is bent outwards and sealed against the cylinder walls at 19, forming a moveable dividing wall between the two cylinder chambers 13 and 14. The brake piston 10 also has an annular/cylindrical center part 21 that extends beyond the spring packet 6 and also carries an annular seal 22, and is free to move axially over its inner support ring seal 17 as the spring packet 6 is loaded and unloaded. The inner support ring 23, is held away from the shaft 3 or from a brake hub body connected with the shaft, and engages radially between the spring packet 6 and the brake disc 11.

Thus, with barely any addition to the length of the brake lifting cylinder, it is possible to achieve a directly integrated brake actuating cylinder by means of which the brake can be modularly applied.

With this arrangement, the spring packet 6 is located on the cover side of the brake housing and is thus extremely accessible, it being unnecessary to remove the brake discs 11, 12 from the vehicle when the springs 6 need replacing.

The bores 32 for the pressure medium connections both to the brake lifting cylinder 13 and to the brake actuating cylinder 14 are only in the intermediate flange 28 that abuts directly against the transmission housing 2. Thus the pressure medium connections always remain in the same positions and the flow of the pressure medium into or out of the two cylinders can be without any actual feed ducts, independent of the configuration or of the position of the first support ring that acts as the brake housing cover.

A further feature that contributes to the short constructional length is that the brake piston 10 that operates parallel to and in the same direction as the spring-pressure direction, is located on the first inner face 8 of a brake actuating cylinder 14 and that its control stroke and control power are at least equal to those of the spring packet 6

Since the brake hub body 25 can be designed as a shaft flange 26 on the end facing the transmission housing and can be provided with facilities for fastening a shaft extension, the same brake housing 5 can either serve as a shaft bearing end cover or (when bored out) as a shaft extension attachment element.

Since the mechanical means (e.g. bolts 38) can only relieve the initial tension of the spring packet when the pressure-medium supply is switched off, the vehicle cannot be inadvertently used if the brake is not functioning.

Since the annular seal 17 on the neck of the cover flange blocks off an outlet opening between the brake actuating cylinder and the transmission housing, it is only necessary to install this annular seal 17 in order to make a parking brake suitable for use also as a service brake. This appreciably reduces the number of types of brake body needed.

When the main drive shaft 3 of a transmission output be used for the shaft of the brake, to make the brake the sole central brake of the vehicle with a higher relative speed of the brake disc 11 than is usual with wheel brakes, then the braking power can be so further increased by such an efficiency-promoting arrangement, that at least on small vehicles (for example, up to 20 km/h) no more than one single brake is needed.

When a pinion or bevel gear 33 of a differential is used as the gear wheel, then the brake can be assembled with the differential housing at a point where considerable heat-dissipation surfaces are available and where the brake reaction forces can be transmitted to the vehicle chassis by a short route.

By using hydraulic oil as a pressure medium whose supply can be combined with the transmission lubrication in a common oil circuit 32 by way of a valve let into the brake housing, one and the same oil can be used both as a brake pressure medium and as a lubricant in the transmission and the venting valves can discharge directly into the transmission. The transmission housing can then act at the same time as the pump sump for the brake circuit. Thus, without any appreciable special expense, splash lubrication with oil circulation and possibly also oil filteration, etc., can be provided.

When the gear wheel 33 is the rim flange of the road wheel, a brake of the invention can also be used on non-driven wheels such as on the wheels of trailers, etc., and smooth braking is thus possible on further axles with similar effectiveness and from the same braking regulator.

The invention provides that the opening 34 of the transmission housing shall be larger than the diameter of the gear wheel 33, in order to facilitate joint dismantling of the brake housing 5 and the gear wheel 33, and further provides that it remains possible to fix the gear 33 to the shaft 3 from the open end of the shaft. It is thus possible for the complete brake assembly to be quickly replaced, without having to remove the brake disc 11 from its drive-type gearing 24, 37 on the spot in case of damage. The initial tension in the spring packet 6 can be adjusted by purely mechanical means (e.g. screws or keys etc.) 38 pressing the cover flange 15 and the intermediate flange 28 together in such a way that in case of pressure-medium absence, the vehicle can still be towed or the initial tension can be altered. Because the brake-actuating cylinder 14 and its inner ring seal 17 are radially disposed outwardly of the spring packet 6 which is in communication with the transmission housing 2, it is possible, merely by omitting the ring seal 17, to waive the modulation capability of the brake provided under the invention without any further modifications to the brake housing, if the pressure of spring packet 6 is sufficient to actuate the brake on its own. This means that the integration of service and parking brake as provided under the invention also leads to an increase in braking safety, because the parking brake comes into effect automatically, i.e. without manual action should there be pressure failure in the brake circuit.

Use of the brake design under the invention for other applications such as lifting gear, machine tools, handling equipment etc. is naturally possible and offers advantages without departing from the features of the invention. This improved safety together with the specific design-related increase in power, where the brake is fitted in a higher rotational speed range, makes it possible to equip vehicles with only one central brake, fitted for instance to the universal shaft or the differential, instead of several wheel brakes. Conditions are especially favorable if drive unit (engine) and differential are joined together and the universal shaft starts at this point.

FIG. 2 illustrates a case where a manual engine-transmission unit 39 is joined with the transmission housing 2 of a differential 41 by a universal shaft 40 and the brake housing 5 according to the invention is integrated into the manual transmission 39, so that braking can be effected at higher relative rotational speeds than those on the wheels 42.

The function of the modulation of braking power is largely determined by the valve design. In a normal case the pressure from the brake lifting cylinder 13 is not supposed to be reduced all of a sudden when the brake is first operated; this only applies to emergency cases or in case of a malfunction; or for parking when the engine is stopped. Therefore the pressure medium system must be laid out in such a way that the pressure in the brake-actuating cylinder 14 together with the spring pressure of the spring packet 6 in the expanded state is sufficient to clearly overcome the counter-pressure from the brake-lifting cylinder and to ensure the necessary compression of the friction surfaces. For this reason the brake-actuating cylinder 14 has a larger effective surface than the brake-lifting cylinder 13 in relation to the brake piston 10.

What is claimed is:

1. A spring loaded single action, wet brake with pressure-medium operable release for vehicles comprising a brake actuating cylinder (14) and an opposing brake release cylinder (13) wherein both cylinders act on opposite faces of a brake piston (10), a shaft (3) of which one end rotates in a brake housing (5) and includes brake discs (11) which have axial play, in an unactivated condition, in relation to the brake piston (10), the brake housing (5) has a first inner face 8 and a second innerface (9) of different surface areas arranged to compensate for motion of a spring packet (6) during brake actuation, the brake discs (11) are pressed together mechanically, between the brake piston (10) and the second inner face (9) of the housing (5) by means of the spring packet (6) installed under tension between the first inner face (8) of the housing (5) and the piston (10), and hydraulically, by activation of the brake actuating cylinder (14); the brake is connected by an intermediate housing (28) to a transmission housing (2), wherein the cylinders (13), (14) and the brake piston (10), which separates both cylinders (13) and (14), concentrically surround the spring packet (6) so that the brake can be removed as a unit from the transmission housing (2) through a cover (15) which closes the brake housing, the cover (15) and the intermediate housing (28) being mounted to a housing sealing surface of the transmission housing (2) with pressure resistant sealing arrangements so that the spring packet (6) is under tension.

2. Brake according to claim 1, wherein the cover (15) has a neck (16) protruding at least partially into the brake piston (10), the neck resting against an inner piston ring seal (17) of the brake piston (10).

3. Brake according to claim 1, wherein the cover (15) and a brake hub body (25) carrying the brake discs (11) engage a shaft to hub body seal (27).

4. Brake according to claim 1, wherein the brake discs (11) are in communication with the interior of gear housing (2) by way of oil passages (30) in the intermediate housing (28).

5. Brake according to claim 1, wherein the brake hub body (25) is assembled to a gear wheel (33) which can be removed with the brake as a unit when cover (15) has been removed.

* * * * *